Patented Aug. 17, 1948

2,447,009

UNITED STATES PATENT OFFICE 2,447,009

METHOD OF REFINING POLYMERIZED ROSIN

Burt L. Hampton, Jacksonville, Fla., assignor, by mesne assignments, to The Glidden Company, Cleveland, Ohio, a corporation of Ohio No Drawing. Application February 23, 1946, Serial No. 649,774

5 Claims. (Cl. 260—97)

This invention relates to a process for improving or upgrading polymerized rosin, by treating the latter with iodoform and heat.

When ordinary rosin is polymerized by known heat-treating methods in the presence of known catalysts, the melting point is raised but the grade of the polymerized rosin, as determined by its color, is lowered appreciably below that of the original rosin. Now it has been found that such polymerized rosin of lower grade may be treated with iodoform and heat to restore it to substantially the grade of the original rosin from which it was obtained, or to higher grades.

It accordingly is an object of this invention to provide a process for upgrading polymerized rosin.

In accordance with the process which has been discovered, the polymerized rosin is brought to a temperature of about 150° C. to 220° C. and a small amount of iodoform is stirred into the molten mass. The temperature of the molten mass is then maintained or brought otherwise to a predetermined level between about 175° C. and 340° C. The mass is then held at this predetermined temperature for a period of time found to effect the desired increase in grade without causing undue losses of rosin as a result of decarboxylation or other destructive reactions. The time which is required varies inversely with the temperature of treatment, a period of from about two to four hours being required at temperatures around 175° C. and a period of from one to ten minutes being adequate at temperatures around 340 C. The preferred temperature range for normal commercial operations is from about 250° C. to 290° C., and at this temperature level a period of treatment of from one-half hour to about one hour is satisfactory.

The amounts of iodoform used in the process lie in the catalyst range rather than in the reagent range, amounts of from about .03% to about 1% being effective. For most purposes, amounts of from about .10% to .40% are found to produce the optimum upgrading under the preferred conditions of time and temperature noted above.

During the treatment with iodoform, some reaction products are formed, and it is desirable but not required that these reaction products be removed from the reaction mass. This may be done conveniently by sparging the mass more or less vigorously with steam, carbon dioxide or other inert gas or vapor. The vigor of the sparging operation should be greatest at the higher treating temperatures, and may be very slight at the low treating temperatures. In some instances it may be beneficial to maintain the mass in an inert atmosphere, such as carbon dioxide, while it is being heated to and cooled from the treatment temperature.

In the following examples, the indicated amount of iodoform was added to the molten mass of polymerized rosin at temperatures around 175° C.–195° C., after which the temperature of the mass was brought gradually to the indicated treatment temperature. Steam was also introduced during this period for sparging and stirring purposes and was continued through the indicated time period of the treatment, the vigor of the sparging treatment being adjusted in the manner indicated above.

| Example | Polymerized rosin | | | Percent CHI₃ | Temp. | Time | Grade | M. P. | A. N. |
|---|---|---|---|---|---|---|---|---|---|
| | Grade | M. P. | A. N. | | | | | | |
| | | | | | | Minutes | | | |
| I | M | 109 | 135 | 0.10 | 270–75 | 60 | N–WG | 108 | 134 |
| II | M | 109 | 135 | 0.15 | 270–75 | 60 | WG– | 109 | 135 |
| III | M | 109 | 135 | 0.20 | 270–75 | 60 | WG | 108 | 135 |
| IV | M | 109 | 135 | 0.30 | 270–75 | 60 | WG | 108 | 133 |
| V | N– | 115 | 132 | 0.30 | 275 | 60 | WG+ | 107.5 | 131 |
| VI | M | 106 | 146 | 0.10 | 195–200 | 180 | WG | 105.5 | 143 |

From the preceding examples it will be evident that in each case the grade of the treated rosin was raised, that the melting point was not reduced appreciably except in Example V, and that substantially no destruction of the rosin occurred as indicated by the negligible changes in acid number. Accordingly it will be apparent that the outstanding effect of the treatment has been to upgrade the polymerized rosin, thereby improving its commercial utility.

Having now described the invention, what is claimed is:

1. The process for refining polymerized rosin which comprises the steps of: heating said rosin to a temperature between about 150° C. and 220°

C.; mixing iodoform with said heated rosin in amounts of from about .03% to 1% by weight of the latter; bringing the temperature of the mixture to between about 175° C. and 340° C. and maintaining said temperature therewithin for a period of time related inversely to temperature in the range of from 2 to 4 hours at 175° C. to about 1 to 10 minutes at 340° C. to effect improvements in grade without substantial decarboxylation.

2. The process for upgrading polymerized rosin which comprises the step of heating said polymerized rosin at temperatures between about 175° C. and 340° C. in the presence of from about .03% to 1% of iodoform as the sole catalyst for a period of from about four hours to one minute, the time and temperature being inversely related to effect improvements in grade without substantial decarboxylation.

3. The process for upgrading polymerized rosin which comprises the step of heating said polymerized rosin at temperatures between about 250° C. and 290° C. in the presence of from about .10% to .40% iodoform as the sole catalyst for a period of from about one-half to one hour.

4. The process for upgrading polymerized rosin which comprises the steps of heating said polymerized rosin at temperatures between about 175° C. and 340° C. in the presence of inert sparging gases and of from about .03% to 1% of iodoform as the sole catalyst for a period of from about four hours to about one minute, the time and temperature of treatment being inversely related to effect improvements in grade with substantial decarboxylation.

5. The process for upgrading polymerized rosin which comprises the step of heating said polymerized rosin at temperatures between about 250° C. and 290° C. in the presence of inert sparging gases and of from about .10% to .40% of iodoform as the sole catalyst for a period of from about one-half to one hour.

BURT L. HAMPTON.

REFERENCES CITED

The following references are of record in the file of this patent:

UNITED STATES PATENTS

| Number | Name | Date |
|---|---|---|
| 2,241,341 | Ender | May 6, 1941 |
| 2,298,271 | Auer | Oct. 13, 1942 |